United States Patent Office 2,924,572
Patented Feb. 9, 1960

2,924,572

AMMONIA OR AMINE MODIFIED OXYGEN AND SULFUR CONDENSED HYDROCARBONS

Franklin I. L. Lawrence and Michael J. Pohorilla, Bradford, Pa., assignors to Kendall Refining Company, Bradford, Pa., a corporation of Pennsylvania No Drawing. Application November 29, 1956
Serial No. 624,985

17 Claims. (Cl. 252—47)

This invention relates to novel compositions of matter useful, inter alia, as additives for lubricating oils. More particularly, the invention embraces modified oxygen and sulfur condensation products of high molecular weight hydrocarbon materials and compositions, including lubricating oil compositions, containing such modified condensation products.

Various types of condensation products produced by the reaction of relatively high molecular weight hydrocarbons with oxygen and sulfur are known to the prior art. Such condensation products are described, inter alia, in United States Patents Nos. 2,337,336, 2,337,337, 2,337,338, 2,337,339 and 2,732,346. Efforts have been made to utilize such condensation products as lubricating oil additives with some degree of success. In general, however, unmodified condensation products produced by the reaction of high molecular weight hydrocarbons, such as petroleum fractions, with oxygen or sulfur are not wholly satisfactory for use as lubricating oil additives due to their lack of adequate basicity required for the neutralization of acidic by-products encountered during engine operation. Furthermore, such unmodified condensation products, particularly those produced by reaction of high molecular weight hydrocarbons with oxygen, have proved objectionably unstable to oxidation, thermally unstable, or otherwise unsatisfactory as lubricating oil additives.

It is a primary object of this invention to provide modified oxygen and sulfur condensed hydrocarbon products having enhanced utility as additives for lubricating oils.

It is a more specific object of the invention to provide compounded lubricating oils, power transmission fluids, shock absorber fluids, and the like, containing the modified oxygen and sulfur hydrocarbon condensation products of the invention.

It is an additional object of the invention to provide compositions effective as viscosity index improving agents and detergents for oleaginous compositions, such as lubricating oils, greases, and the like.

It is a further and primary object of the invention to provide oleaginous compositions of improved viscosity index containing the modified oxygen and sulfur condensed hydrocarbons of the invention.

It is still another object of the invention to provide compositions useful as lubricating oil additives which are resistant to oxidation.

It is a further object of the invention to provide compositions effective to simultaneously improve the viscosity index and depress the pour point of lubricating oils.

It is an important object of the invention to provide novel products useful to disperse in lubricating oils and other compositions, additive materials which are insoluble therein.

The invention contemplates modified oxygen and sulfur condensed hydrocarbons produced by contacting a hydrocarbon starting material having an ebullioscopic molecular weight of at least about 500, preferably in excess of 800, at a temperature of at least about 400° F., preferably about 425° F. to about 575° F., with a material selected from the group consisting of elemental sulfur and elemental oxygen for a time period requisite to produce an intermediate condensation product having a viscosity at 210° F. of at least 250 SUS greater than the viscosity of said starting material at 210° F., and thereafter reacting said intermediate condensation product with a material selected from the group consisting of ammonia and the amines responding to the following generic formula to produce a final modified condensation product.

I 

In the foregoing Formula I, R represents (a) a straight or branched chain, cyclic or acyclic alkyl radical containing from 1 to 20 carbon atoms, (b) an aryl radical which is either mono- or dicyclic and which contains not more than 18 carbon atoms, (c) an alkaryl radical containing from 1 to 20 carbon atoms, or (d) an alkylene polyamine radical containing not more than 20 carbon atoms. $R_1$ in the foregoing formula is hydrogen or any of the various radicals represented by R. Either R or $R_1$ may be substituted by halogen substitutents including chlorine, bromine, iodine, and fluorine substituents, hydroxyl groups, amine substituents, including particularly the primary amino group $NH_2$ and the like. Representative alkyl groups included within the scope of R and $R_1$ in the foregoing formula include methyl groups, ethyl groups, normal and isopropyl groups, normal and isopentyl groups, hexyl, cyclohexyl, heptyl, octyl, nonyl, decyl, dodecyl, tetradecyl and octadecyl groups. Similarly, the unsaturated mono- and diolefinic analogs of each of the above identified alkyl groups are contemplated. In compounds wherein either R or $R_1$ is aryl, there are contemplated phenyl radicals, biphenyl groups, triphenyl groups, naphthyl groups, anthracyl groups, and the like. In cases where R and $R_1$ represent arylalkyl groups, the aryl nuclei contemplated include all of the various aryl nuclei above identified having alkyl substituents such as those described with reference to the embodiments of the invention wherein R is alkyl, provided the total number of carbon atoms in the arylalkyl groups does not exceed 20. Representative arylalkyl groups include tolyl groups, xylenyl groups, ethylphenyl groups, propylphenyl groups, hexylphenyl groups, dodecylphenyl groups, and the like.

The modified condensation products of the invention are usually characterized by a ring and ball softening point, as measured by A.S.T.M. method E-28-42T, of more than about 80° F. Some modified condensation products comprehended by the invention have a ring and ball softening point or viscosity too low to be effectively measured in accordance with the aforementioned procedure. In any event, the modified condensation products of the invention are characterized by a viscosity of at least about 400 SUS at 210° F., preferably at least about 1,000 to 5,000 SUS at 210° F., and, in all cases, a viscosity of at least about 250 SUS at 210° F. greater than the hydrocarbon starting materials from which the modified condensation products are produced.

In the preferred embodiments of the invention the modified condensation products are effective in a concentration of about 10% by weight to increase the viscosity index of a 60 at 100 SUS standard base oil at least ten viscosity index units more than a like amount of the hydrocarbon starting material from which said condensation product is produced. Specifically with respect to lubricating oils and greases, the modified condensation products of the invention are appropriately utilized in a concentration of at least about 1.0% by weight, preferably from about 3.0% to about 15.0% by weight.

The invention contemplates the use of the recited resinous agents in all proportions effective to improve such characteristics as viscosity index, detergency, pour point, etc. of all oleaginous compositions, including base oils, greases, power transmission fluids, shock absorber fluids, and the like, in which they are incorporated. The modified condensation products can be employed in oils, greases, and power transmission fluids derived from Pennsylvania crude oils, Mid-Continent crude oils, asphalt base oils, and all other types of mineral oils, as well as synthetic oils, including particularly the synthetic ester type oils, such as di-2-hexylethyl sebacate and di-2-ethylhexyl adipate, and phosphonate oils, such as dibutyl diphosphonate, tetrabutyl tetramethylene diphosphonate, and bis(2-ethylhexyl) 2-ethylhexyl phosphonate. The invention contemplates such oleaginous materials generically.

The rate of supply of elemental oxygen or elemental sulfur to the reaction mixture is not critical to the production of intermediate stage condensation products. Generally, when elemental oxygen is employed, a free oxygen-containing gas is passed through the condensation reaction mixture at a rate requisite to provide at least about 10 cu. ft., preferably from about 11 to about 27 cu. ft., of oxygen per gallon of hydrocarbon starting material per hour. In the case of air, the corresponding rates are at least about 50 cu. ft. of air per gallon of starting material per hour. The preferred range is from about 55 to 135 cu. ft. of air per gallon of starting material per hour.

In the production of the intermediate sulfur condensation products, at least about 2%, preferably about 10% to about 30%, by weight of sulfur is employed in the condensation reaction pursuant to which the intermediate stage condensation products are produced. Two suitable methods of sulfur addition are hereinafter described.

A first method is to add most of the sulfur, or about 20 to 25 parts by weight of sulfur per 100 parts of hydrocarbon, at room temperature or some temperature below that at which sulfur will readily react with the hydrocarbon, i.e., about 300° to 400° F., preferably 350° F. The temperature is then slowly raised to a temperature of about 450° F. to about 600° F., preferably about 500° F., at a rate so that the foam caused by the hydrogen sulfide generated in the reaction will not overflow the reaction vessel, generally during a time period of about two to four hours or more. A small additional amount of sulfur is then added to increase the ring and ball softening point of the intermediate condensation product to a desired number.

A second method entails first heating the hydrocarbon to the reaction temperature, i.e., about 450° to about 600° F., preferably about 500° F., followed by the addition of sulfur slowly enough so the foam caused by the generated hydrogen sulfide does not overflow the reaction vessel. This rate is generally about 0.5 to about 2.0, preferably about one part by weight of sulfur per 100 parts by weight of hydrocarbon every 0.25 to 0.50 hour.

About 16 hours or more may be used to effect the condensation, but this extreme length of time is not preferred. It is preferable to limit the time at the elevated temperature to less than 8 hours.

Reactive materials, such as chlorine, hydrogen chloride, phosphorus pentoxide, and like materials, which serve as activators can appropriately be introduced into the reaction mixture in conjunction with the elemental oxygen or sulfur. Conventional catalysts known to the art can be employed.

The substantially oil compatible hydrocarbonaceous intermediate condensation products, which are modified in accordance with this invention, appear to result from the chain reaction of free radical intermediates which are formed thermally or by the reaction of at least some of the molecules of the hydrocarbon starting materials with oxygen or sulfur.

The hydrocarbon starting materials contemplated by the invention embrace all hydrocarbon materials having an ebullioscopic molecular weight of at least about 500, including all of the various appropriate petroleum fractions, essentially pure hydrocarbons, and the like. Preferably, the hydrocarbon starting materials are characterized by an ebullioscopic molecular weight of at least about 1,000. An optimum average ebullioscopic molecular weight range is from about 1,200 to about 1,700.

The most appropriate starting materials for the production of the modified condensation products contemplated by the invention take the form of suitable fractions of crude oils. Appropriate fractions derived from crude oils of any source, including Pennsylvania crude oils, Mid-Continent crude oils, West Coast crude oils, Canadian crude oils, and the like, can be employed. All types of crude oils, including paraffin base crude oils, asphalt base crude oils, and naphthenic crude oils provide suitable sources from which petroleum fractions useful in the production of the modified condensation products of the invention can be derived.

While the invention contemplates the production of modified condensation products from pure or substantially pure individual hydrocarbons, such materials do not constitute optimum starting materials.

With respect particularly to fractions derived from Pennsylvania crude oils, it is preferred that the hydrocarbon starting materials be characterized by a bromine number not in excess of 10.

It is additionally preferred that hydrocarbons which are utilized as starting materials contain more than about two naphthenic rings per molecule, which rings can be individually integrated with the paraffinic chain portion of the hydrocarbon molecules or condensed with aromatic rings and/or with other naphthenic ring systems. It is also preferred that the hydrocarbon starting materials contain an average of not more than about 50% aromatic carbon atoms. Hydrocarbon which contain an appreciable quantity of highly condensed ring systems, such as those hydrocarbons which are found in the phenol or furfural extracts of lubricating oils, are operable and are most appropriately employed as starting materials for the production of modified condensation products for use as additives for synthetic lubricating oils, such as the various diester oils.

Additionally, it is preferred that the petroleum fractions from which the modified condensation products of the invention are produced contain not more than about 10% of wax type materials. The wax content herein referred to is determinable by a procedure similar to that described under A.S.T.M. designation D-721-51T with the exception that methylisobutyl ketone is employed to precipitate the wax, the sample size is reduced to 0.5 gram, and the determination is conducted at 0° F. While the starting materials which contain substantially more than 10% by weight of wax, as determined by this test, e.g., petrolatum which may reflect a wax content on the order of 40% by weight, can be employed in the production of the viscosity index improving agents of the invention, such materials are not preferred. Such materials can be best used by blending with more desirable starting materials, such as the preferred petroleum fractions above described, in proportions up to about 25% by weight of the total blend.

Normal or vacuum distillation residual stocks and analogous fractions of paraffin base crude oils, such as Pennsylvania crude oils, are highly appropriate starting materials. Hydrocarbons precipitated by conventional propane precipitation processes from such residual stocks are particularly suitable.

Further refinement of such propane precipitated, high molecular weight hydrocarbons, which include both light and heavy resin fractions, by extraction with furfural or phenol in conventional manner, yields a raffinate from which modified condensation products of maximum effectiveness, inter alia, as viscosity index improvers, are produced. Conventional solvent extraction processes are utilized to obtain such raffinates. Such processes are well known to the prior art and are described in detail, inter alia, in Industrial and Engineering Chemistry, 40, pages 220–227 (1948), and at pages 335–336 of "Chemical Refining of Petroleum" by V. A. Kalichevsky and B. A. Stagner, Reinhold Publishing Co. (1942). Generally, the degree of extraction should be such as to yield about a 70% to 85% raffinate. More drastic extraction, for example, to yield 50% to 60% raffinates, may be practiced to obtain still more desirable starting materials for the production of the viscosity index improving agents of the invention.

The most preferred starting material embraces a solvent extracted Pennsylvania crude oil fraction having a molecular weight of from about 1,200 to about 1,700, a bromine number of not more than about 4, which is substantially wax and asphalt free, which contains not more than about 5% by weight of hydrocarbon molecules containing more than 50% aromatic carbon atoms, and which consists primarily of hydrocarbon molecules containing an average of from about 2 to about 7 naphthenic rings.

The intermediate condensation products are modified in accordance with the invention by reaction with ammonia or an amine responding to the Formula I above described. The specific amines contemplated include the aromatic amines which respond to the following generic formula:

II  R—A—NR$_1$ wherein A is an aryl radical including phenyl, diphenyl, triphenyl, naphthyl, and anthracyl radicals, and wherein R and R$_1$ have the same significance as in Formula I above.

A second subgeneric group of amines contemplated by the invention for modification of the intermediate stage condensation products comprises the polyalkylene polyamines responding to the following generic formula:

III  R$_2$NH—(R$_3$NH)$_x$—R$_2$ wherein R$_2$ is the same or different and represents the same radicals as in Formula I above, and wherein R$_3$ represents an alkylene radical containing from 1 to 10 carbon atoms, and wherein $x$ is any integer, the total number of carbon atoms represented in Formula III not exceeding 20.

Specific amine containing compounds contemplated by this invention include the various hydroxylamines such as hydroxylamine, N-phenylhydroxylamine, N-methylhydroxylamine, N,N-diphenylhydroxylamine, O,N-dimethylhydroxylamine; ethanolamine and its various analogues such as diethanolamine, triethanolamine, N,N-diethylethanolamine, phenylethanolamine, and N-aminoethyl diethanolamine; tertiary amines such as trimethylamine, triphenylamine, dimethylaniline; and quaternary amines such as tetramethyl ammonium hydroxide, benzyltrimethyl ammonium hydroxide, ethyltrimethyl ammonium chloride, phenyltrimethyl ammonium iodide. In addition amides such as acetamide, stearamide, benzamide, N-methylacetamide and amides of dibasic acids such as succinamide and its cyclic derivative succinimide, urea and its derivatives such as N,N'-diethyl urea, thiourea, and cyclic derivatives such as the ureides of which parabanic acid and barbituric acids are examples; and the various heterocyclic compounds as exemplified by pyrrole, indole, carbazole, pyridine, piperdine, imidazole, imidazoline, quinoline, and the like.

The modification of the intermediate stage condensation product with ammonia or any one or combination of the amines above described is effected by heating a mixture of the condensation product and the selected ammonia or amine reagent or reagents at an appropriate temperature for a short period of time. In general, at least about 0.25% by weight, preferably about 0.25% to about 5.0% by weight of the ammonia or amine, or mixtures thereof, is employed, based on the weight of the intermediate condensation product. Such quantities generally afford an excess of the reagent, which is not objectionable. A temperature of at least about 150° F., preferably from about 175° F. to about 500° F., and a reaction time of at least about 20 minutes, preferably from about 20 to 120 minutes, is generally satisfactory. The reaction may be conducted under an inert atmosphere, if desired. In the case of certain of the organic amines, temperatures must be controlled to prevent decomposition. A preferred procedure is to convert the hydrocarbon fraction employed as a starting material to an oxygen or sulfur condensation product having a ring and ball softening point somewhat below, for example, 10° to 20° below the softening point desired in the final product, followed by reaction with the above described reagents to an extent requisite to raise the ring and ball softening point to the ultimately desired value.

Inasmuch as many condensation products are readily workable only at relatively high temperatures, i.e., 350° to 450° F., an alternative method for modifying such products is advantageously employed when the ammonia or amine reagents are utilized which may be unstable at such high temperatures. Such alternative procedure embraces first blending in appropriate proportions the condensation product which is to be modified with the lubricating oil or other base stock in which it is to be ultimately utilized, followed by the addition of a suitable quantity of ammonia or amine. More specifically, the condensation products may be mixed in proportions of at least about 10%, preferably from about 20% to 50% by weight with the ultimate base stock in which they are to be utilized. To the mixture so obtained, there is then added, preferably in small proportions, at least about 0.5% to about 5% by weight of the desired reagents, based upon the condensation product. Such addition may be effected under an inert atmosphere, if desired. The desired reaction is then effected at a temperature of at least about 150° F., preferably from about 175° to 275° F. The ultimate product so obtained is then admixed in appropriate concentration with additional quantities of the base stock.

It has been discovered that the compositions of this invention constitute an excellent medium for blending with lubricating oils and other fluids, various antioxidant and other materials which are insoluble in oils alone and which, therefore, have heretofore been considered unsuitable for use in lubricating oil compositions. Typical of such antioxidants is phenothiazine, and the substituted phenothiazines responding to the following formula:

IV

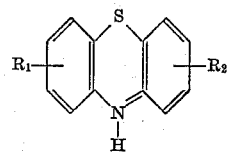

R$_1$ and R$_2$ are hydrogen or alkyl radicals containing not more than 10 carbon atoms including, by way of example, those various specific alkyl radicals specified with respect to Formula I. There can be from 0 to 4 such R substituents in each aromatic nucleus.

Antioxidants, other than phenothiazines, which can be similarly employed, include ascorbic acid, low molecular weight dithiophosphate esters, such as the zinc dithiophosphates of which the zinc salt of n-butyl dithiophosphoric acid is representative, aromatic amines, such as β-naphthylphenylamine, di-β-naphthylamine, diphenyl-p-phenylene diamine, di-β-naphthyl-p-phenylene diamine, mercaptobenzothiazole, and the like.

Any desired method may be employed to incorporate the antioxidants with the modified oxygen and sulfur condensation products of the invention. In accordance with one satisfactory method, the modified oxygen or sulfur condensation products are first heated to above the softening point, and the phenothiazine or other antioxidant or material to be incorporated is then blended therewith. The blend so formed is thereafter dissolved or dispersed in a lubricating oil, power transmission fluid, or the like, in conventional manner. In some instances, the antioxidants are added to oil blends of the unheated modified condensation products.

Additional materials which can be incorporated into lubricating compositions through the medium of the modified condensation products of this invention include alkaline earth carbonates, such as those of barium and calcium, the various alkaline earth oxides and hydroxides, boric acid, boric acid esters, and the like.

Also, there may be blended with the oils, power transmission fluids, and the like, containing the modified oxygen and sulfur condensation products of this invention, antioxidants known to be useful in lubricating oil. Typical of such antioxidants are the various phenates, dithiophosphates, amines, phenols, dithiocarbamates, phosphites, and the like. It is the intent of this disclosure to embrace such antioxidants generically. Since these materials are well known to the art, they are not further enumerated here.

It will be appreciated that the condensation products disclosed as being useful, inter alia, as viscosity index improving agents in this invention can be employed in fuel oil materials to prevent the precipitation of solids therefrom as a result of the capability of such condensation products to suspend finely divided solids. A typical example is a blend of virgin distillate gas oil and catalytically cracked fuel oil with at least about 0.05%, preferably about 0.1% to about 5.0% by weight, of the modified condensation product of Example I of this specification.

EXAMPLE I

*Separation from cylinder stock of viscous hydrocarbons for use in the preparation of modified condensation products*

About 75,000 grams of a cylinder stock derived by distillation from paraffin base Pennsylvania crude oil and characterized by a boiling point in excess of about 850° F., a molecular weight of about 750, a viscosity at 210° F. of 225 SUS, an A.P.I. gravity of about 24.8, and a flash point (Cleveland Open Cup) of about 600° F. are mixed with propane heated to a temperature of about 190° F. and then cooled to a temperature of about 65° F. The cylinder stock-propane solution is thereafter transferred into a chilling tank wherein the pressure is reduced to an extent requisite to volatilize sufficient propane to lower the temperature of the solution to about −20° F. to about −50° F. Makeup propane is added during the chilling operation, such that the ratio of propane to cylinder stock is about 3 to 1 at the end of the chilling cycle. During the chilling cycle, petrolatum is precipitated from the solution. The chilled cylinder stock-propane solution containing precipitated petrolatum is transferred to a filter feed tank and thence passed through an appropriate filter to effect removal of the petrolatum from the chilled solution.

Propane is added to the filtrate in an amount sufficient to raise the propane-cylinder stock ratio to about 10 to 1 and the temperature of the solution so obtained is elevated to about 150° F. to 180° F. whereupon about 15,000 grams of high molecular weight viscous materials are precipitated. These viscous materials still contain some propane.

The material so obtained is then mixed at a temperature of about 130° F. to 135° F. with additional propane to increase the propane-oil ratio to about 20 to 1. The temperature of the resulting solution is lowered to about 100° F. whereupon about 6,000 grams of viscous hydrocarbons are precipitated. These materials, after removal of all residual propane, are designated as heavy resins and are characterized by a molecular weight of about 1,400, a viscosity of about 4,100 SUS at 210° F., and a bromine number of 3.7.

The remaining oil-propane solution is heated to about 150° F., whereupon 9,000 grams of additional viscous hydrocarbons, which are designed as light resins, are precipitated. Any residual propane is removed in a flash chamber. These hydrocarbons are characterized by a molecular weight of about 1,300, a viscosity of about 1,150 SUS at 210° F., and a bromine number of about 4.0.

*Preparation of intermediate sulfur condensation product*

About 9,000 grams of the viscous materials separated from the cylinder stock, in the manner above described and designated as light resin, and 1,000 grams of bright stock are charged to suitable apparatus and initially heated to a temperature of 500° F. Sulfur is introduced into the mixture in increments totaling about 1% of the weight of the mixture as the temperature is raised. The sulfur addition is continued for approximately 8 hours until a total amount of sulfur equal to about 22% by weight of the mixture is added, during which time the reaction mixture is maintained at a temperature of approximately 500° F. to produce a final product characterized by a ring and ball softening point of about 145° F. The final product was contacted with air to remove sulfur compounds therefrom and to produce a material non-corrosive to a copper strip when tested pursuant to ASTM Procedure D–130. The bright stock referred to is a fraction of Pennsylvania paraffin base crude oil having a boiling point range greater than about 850° F., a viscosity of about 150 SUS at 210° F. and obtained by solvent dewaxing and deresining of cylinder stock.

EXAMPLE II 100 parts by weight of the intermediate sulfur condensation product described in Example I are heated to a temperature of about 400° F. About 2.0% by weight, based on the weight of said intermediate stage condensation product, of diphenylamine is added. The reaction mixture is heated at a temperature of about 400° F. for an additional time period of about one hour.

The resulting product is blended in the proportion of about 7.5% by weight with a blend of neutral oils having a viscosity of about 38 SUS at 210° F. and a viscosity index of 91.5, derived from Pennsylvania paraffin base crude oil by redistillation of a wide boiling, dewaxed primary distillate. The resulting blend is characterized by a viscosity of 155.2 SUS at 100° F., 47.2 SUS at 210° F. and a viscosity index of 145.5.

EXAMPLE III

Example II is repeated, with the exception that the intermediate stage sulfur condensation product employed is characterized by a ring and ball softening point of about 200° F., and is produced by terminating the sulfur condensation reaction described in Example II at that stage. Similar results are obtained.

EXAMPLE IV

An intermediate stage sulfur condensation product is produced from a fraction of Pennsylvania paraffin base crude oil designated as heavy resin in Example I, which has been further processed by solvent extracting with phenol to a 65% raffinate yield. The heavy resin raffinate is characterized by an average molecular weight of about 1,680, a viscosity of about 1,550 SUS at 210° F., a bromine number of about 1.2, and is substantially wax and asphalt free. The intermediate stage sulfur condensation product of this material is prepared by heating the raffinate to a temperature of about 475° F., followed by condensation with about 21% by weight of sulfur, while the reaction mixture is maintained within a temperature range of 450° to 500° F. for a time requisite to produce an intermediate stage condensation product having a ring and ball softening point of about 154° F. The intermediate stage sulfur condensation product is cooled to a temperature of about 400° F., after which about 3% by weight of aniline is passed through the reaction mixture. The reaction mixture is maintained at a temperature of about 400° F. for a period of about one hour to produce a final product having a ring and ball softening point somewhat higher than that of the intermediate stage sulfur condensation product. The product so prepared is blended in a proportion of about 7.5% by weight with the blend of neutral oils described in Example II to produce an automotive crankcase oil.

EXAMPLE V

Example IV is repeated, with the exception that in this instance there is employed about 4% by weight of normal hexylamine in lieu of aniline, and the reaction between the amine and intermediate stage condensation product is effected at a temperature of about 350° F. Similar results are obtained.

EXAMPLE VI

Example IV is repeated, with the exception that there is employed about 1% by weight, based on the weight of the intermediate stage sulfur condensation product, of cyclohexylamine.

EXAMPLE VII

Example IV is repeated, with the exception that there is employed about 2.5% by weight, based on the weight of the intermediate stage sulfur codensation product, of phenylethylamine.

EXAMPLE VIII

Example V is repeated, with the exception that in this instance normal octylamine is employed.

EXAMPLE IX

About 100 parts by weight of a bright stock extract (a fraction of Pennsylvania crude oil removed from Pennsylvania bright stock by phenol extraction) are employed as the starting material for the production of a modified sulfur condensation product. The bright stock extract is characterized by the following physical properties:

| | |
|---|---|
| Gravity, API | 10.4° |
| Viscosity at 100° F., SUS | 840,000 |
| Viscosity at 210° F., SUS | 1,210 |
| Viscosity index | −173 |

The bright stock extract is condensed with sulfur to produce an intermediate stage condensation product having a ring and ball softening point of about 248° F. and containing about 3.4% of combined sulfur. The product so obtained is reacted at a temperature of about 325° F. with orthodiaminobenzene for a period of about 1½ hours to produce a final modified condensation product. The modified condensation product is blended in a concentration of about 4% by weight with a synthetic lubricating oil consisting essentially of di-2-ethylhexyl adiphate.

EXAMPLE X

A light resin raffinate obtained by phenol extraction of the light resins of Example I to an 85% raffinate and characterized by an ebullioscopic molecular weight of about 1,350 and a viscosity at 210° F. of about 916 is employed as the starting material for the production of a modified condensation product. An intermediate stage condensation product is prepared from the light resin raffinate in the same manner as described in Example I, the sulfur condensation being carried to a point requisite to yield a material characterized by a ring and ball softening point of about 188° F.

The intermediate stage condensation product so produced is reacted at a temperature of about 400° F. for a period of about one hour with about 0.5% by weight of mixture of polyalkylene polyamines consisting essentially of diethylene triamine and triethylene tetramine. The ring and ball softening point of the reaction product is 220° F. The modified condensation product is blended in a proportion of about 4% by weight with a 60 at 100° F. neutral oil derived from Pennsylvania paraffin base crude oil by redistillation of a wide boiling, dewaxed, primary distillate and characterized by a viscosity at 210° F. of 35.1 SUS and a viscosity index of 88.7. The resulting blend is characterized by a viscosity of 70.0 SUS at 100° F., 36.9 SUS at 210° F. and a viscosity index of 127.

EXAMPLE XI

Example X is repeated, with the exception that there is employed a light resin raffinate sulfur condensation product having a ring and ball softening point of about 216° F. Such product is treated with about 2° by weight of diphenylamine, under the same conditions and in the same manner as described in Example X. This product is then blended in the same concentration and in the same manner with the same commercial oil as described in Example X. The resulting blend is characterized by a viscosity at 100° F. of 71.0 SUS, 37.2 SUS at 210° F., and a viscosity index of 132.9.

EXAMPLE XII

Approximately 5,000 grams of a light resin raffinate sulfur condensation product of the type described in Example X, but having a ring and ball softening point of about 249° F., are reacted with ammonia gas for a period of about one hour at a temperature of 500° F. Gaseous ammonia is passed through the reaction mixture at the rate of about 8 liters per hour. The reaction product has a ring and ball softening point of about 260° F. and contains 0.8% chemically combined nitrogen. The product so prepared is blended in the proportion of about 7.5% by weight in a blend of neutrals obtained from Pennsylvania crude and characterized by a viscosity of 38 SUS at 210° F., 84.7 SUS at 100° F., and a viscosity index of 91.5. The resulting blend is characterized by a viscosity of 46.9 SUS at 210° F., 155.7 SUS at 100° F., and a viscosity index of 142.6.

*Preparation of intermediate oxygen condensation product*

EXAMPLE XIII

About 9,000 grams of the viscous materials separated from the cylinder stock, in the manner described in Example I and designated as light resin, and 1,000 grams of bright stock are charged to suitable apparatus for air blowing and initially heated to a temperature of 500° F. Air is passed through the mixture at a rate of about 60 cu. ft./gal./hr. as the temperature is raised. The air blowing is continued at about the same rate for approximately 8 hours, during which time the reaction mixture is maintained at a temperature of approximately 500° F. to produce a final product characterized by a ring and ball softening point of about 250° F. The bright stock referred to is a fraction of Pennsylvania paraffin base crude oil having a boiling point range greater than about 850° F., a viscosity of about 150 SUS at 210° F. and obtained by solvent dewaxing and deresining of cylinder stock.

EXAMPLE XIV

About 100 parts by weight of the intermediate stage oxygen condensation product as described in Example XIII are heated to a temperature of about 400° F. and reacted at that temperature for a period of about 4 hours with about 5 parts by weight of ethyl-n-dodecylamine. The product so produced is blended in a proportion of about 5% by weight with the 60 at 100° F. neutral oil described in Example X to produce an automobile lubricating oil composition.

EXAMPLE XV

Example XIV is repeated, with the exception that in this instance there is employed about 4 parts by weight of tetraethylene pentamine in lieu of the amine employed in Example XIV.

EXAMPLE XVI

Approximately 5,670 grams of 90% light resin, as described in Example I, are blended with 10% by weight of bright stock of the same type as described in Example XIII.

The mixture so produced is air blown at a temperature of about 500° F. to a ring and ball softening point of about 200° F. This product is lowered to a temperature of 430° F., at which time about 383.5 grams of elemental sulfur are added. After a reaction time of about 4 hours, the ring and ball softening point of the product rises to about 290° F., and the product contains about 1.63% sulfur. To about 5,200 grams of this product, there are added 244 grams of diphenylamine while the reaction mixture is held at a temperature of about 400° to 450° F. for 2 hours. There is produced in this manner a final product having a ring and ball softening point of 293° F.

About 7.5% by weight of this product is blended with 92.5% by weight of the blend of neutrals described in Example II, the resulting oil being characterized by a viscosity at 210° F. of 50.4 SUS, a viscosity of 179.1 SUS at 100° F., and a viscosity index of 147.5. The oil so produced is tested by the Underwood Oxidation Test procedure, together with a similar product of Example XIII, for comparative purposes, for 20 hours with the following results:

| | Product of Ex. XVI | Product of Ex. XIII |
| --- | --- | --- |
| Bearing weight loss | 5.7 mg | |
| Sludge, naphtha insolubles | 16.3 mg./10 gm. oil. | 277.9 mg./10 gm. oil. |
| Viscosity increase | −5.0% | 7.1%. |

EXAMPLE XVII 3,860 grams of the same mixture of light resin and bright stock as described in Example XVI are air blown at a temperature of about 500° F. to a ring and ball softening point of about 190° F. There is then added about 10% by weight of a mixture of polyalkylene polyamines consisting predominantly of diethylene triamine and triethylene tetramine. The temperature of the reaction mixture is maintained at 400° F. for a period of 2 hours, and the product is stripped of volatile light ends by bubbling nitrogen vigorously therethrough. The resulting product is blended in a proportion of 7.5% by weight with the neutrals described in Example II. The resulting oil is tested by the Underwood Oxidation Test procedure, together with a similar oil containing 7.5% by weight of the product of Example XIII, for 20 hours with the following results:

| | Product of Ex. XVII | Product of Ex. XIII |
| --- | --- | --- |
| Sludge | 19.8 mg./10 gm. oil. | 277.9 mg./10 gm. oil. |
| Viscosity increase at 210° F | 2.4% | 7.1%. |

EXAMPLE XVIII 400 grams of the intermediate stage oxygen condensation product described in Example XIII are mixed with 66.8 grams of beta-naphthylphenylamine with agitation at a temperature of about 450° F. When the amine is completely dispersed, there are added 4,633.2 grams of a medium neutral raffinate and 17.5 grams of a zinc alkyl dithiophosphate in which the alkyl groups are derived from aliphatic alcohols containing 6 to 10 carbon atoms, and which is sold commercially as LZ 360. The resulting composition is tested by the Cub Engine KRC–19 test procedure on a comparative basis with a like oil containing a like proportion of the product of Example XIII with the following results:

| | Product of Ex. XVIII | Product of Ex. XIII |
| --- | --- | --- |
| Bearing weight loss grams | 0.032 | 0.082 |
| Viscosity increase percent | 38 | 58 |
| Benzene insolubles do | 0.31 | 2.5 |
| Pentane insolubles do | 0.35 | 2.6 |

The above data reflect increased oxidation stability of the product of Example XVIII as compared with the unmodified condensate of Example XIII.

The medium neutral raffinate employed is a solvent extracted neutral obtained from Pennsylvania base crude having a viscosity of about 45 SUS at 210° F., a boiling range of about 740° to about 850° F., and a pour point of +15° F.

The KRC–19 Engine Test referred to in this example is a test procedure run in a Cub engine, which procedure is designed to coordinate with the CRC L–4 Test. Specifically, the conditions observed in the KRC–19 Test entailed operation of the engine at 2,500 r.p.m. at 11 brake horsepower for 40 hours, with an oil temperature of 265° F. and a water jacket outlet temperature of 250° F.

EXAMPLE XIX

An intermediate stage condensation product is produced from the light resin raffinate described in Example X by condensation with 28.5% sulfur at a temperature of 500° F. The intermediate stage condensation product so produced is characterized by a ring and ball softening point of about 249° F. Ammonia is then introduced into the intermediate stage product at the rate of about 8 liters per minute for 1 hour, at a temperature of 500° F. to produce a final product having a ring and ball softening point of about 261° F. The product obtained is characterized by a carbon content of 81.8% by weight, a hydrogen content of 10.8% by weight, a nitrogen content of 0.8% by weight and a sulfur content of 5.9% by weight. The product so produced is then blended in the proportion of about 7.5% by weight with a commercial lubricating oil to produce a product characterized by a viscosity at 210° F. of 46.9 SUS, a viscosity at 100° F. of 155.7 SUS and a viscosity index of 142.6.

EXAMPLE XX

An intermediate stage sulfur condensation product as described in Example I is blended in proportions of about 10% by weight with 90% by weight of a mineral lubricating oil. The resulting blend is thereafter treated with a mixture of polyalkylene amines consisting essentially of diethylene triamine and triethylene tetramine in the same manner as described in Example X.

EXAMPLE XXI

The light resin raffinate described in Example X is air blown at a temperature of 500° F. to produce an intermediate oxygen condensation product characterized by a ring and ball softening point of 197° F. Ammonia gas is passed through the intermediate stage product at a rate of approximately 8 liters per minute for a period of one hour. The product obtained has a final ring and ball softening point of 214° F. and a nitrogen content of 0.7% by weight. The product so obtained is blended with the mixture of neutrals described in Example II in the proportion of 7.5% by weight. The final oil had a viscosity of 148.4 SUS at 100° F., 46.1 SUS at 210° F. and a viscosity index of 142.6.

EXAMPLE XXII

An intermediate sulfur condensation product having a ring and ball softening point of 244° F. is produced from the same light resin raffinate as described in Example X. Ammonia is introduced into the intermediate stage product at ther ate of about 8 liters per minute for one hour at a temperature of 500° F. to produce a final product having a ring and ball softening point of about 248° F. and characterized by a nitrogen content of 0.70%.

There is blended with 1.97% of this product about 97.78% of the medium neutral raffinate and 0.25% of zinc alkyl dithiophosphate as described in Example XVIII. The resulting lubricating oil composition is tested in the CRC L-4 procedure in a Chevrolet engine and compared with a similar lubricating oil composition which contains 1.97% of the intermediate sulfur condensation product described above. The following results are noted after 36 hours.

|  | Ammonia Modified Product | Intermediate Sulfur Condensation Product |
| --- | --- | --- |
| Piston Color | 9.6 | 7.2 |
| Bearing Weight Loss, gms | 0.29 | 0.95 |
| CRC Merit Rating | 97.5 | 89.7 |

We claim:

1. A condensation product produced by contacting a hydrocarbon starting material having an ebullioscopic molecular weight of at least about 500 at a temperature of at least about 400° F. with a material selected from the group consisting of elemental sulfur and elemental oxygen for a time period requisite to produce an intermediate condensation product having a viscosity at 210° F. at least 250 SUS greater than the viscosity of said starting material at 210° F., and thereafter reacting said intermediate condensation product with a material selected from the group consisting of ammonia and the amines responding to the formula:

wherein R represents a radical selected from the group consisting of the alkyl radicals containing from 1 to 20 carbon atoms, the aryl radicals containing not more than 18 carbon atoms, the alkaryl radicals containing from 1 to 20 carbon atoms, and the alkylene polyamine radicals containing not more than 20 carbon atoms, and wherein $R_1$ is hydrogen or any of the various radicals represented by R.

2. The composition of claim 1 wherein said intermediate stage condensation product is produced at a temperature of about 425° F. to about 575° F.

3. The composition of claim 1 where the amine reacted with said intermediate stage condensation product is an aromatic amine.

4. The composition of claim 1 wherein the amine reacted with said intermediate stage condensation product comprises a polyalkylene polyamine.

5. The composition of claim 1 wherein ammonia is reacted with said intermediate stage condensation product.

6. The composition of claim 1 wherein said material reacted with said intermediate stage condensation product is employed in a concentration of at least about 0.25% by weight based on the weight of said intermediate condensation product.

7. The composition of claim 1 wherein said intermediate stage condensation product is reacted with said material at a temperature of at least about 150° F.

8. The composition of claim 1 wherein said intermediate stage condensation product is blended with a lubricating oil to provide a blend containing at least about 10% by weight of said intermediate stage condensation product, and the resulting mixture is thereafter reacted with said material.

9. The composition of claim 3 wherein said aromatic amine is diphenylamine.

10. The composition of claim 4 wherein the polyalkylene polyamine is diethylene triamine.

11. The composition of claim 4 wherein the polyalkylene polyamine is triethylene tetramine.

12. The composition of claim 6 wherein said material is employed in a concentration of from about 0.25% to about 5% by weight based on the weight of said intermediate condensation product.

13. A condensation product prepared by contacting a hydrocarbon starting material having an ebullioscopic molecular weight in excess of about 500 while at a temperature of at least about 400° F. with elemental oxygen for a time period requisite to produce an intermediate stage condensation product having a viscosity at 210° F. at least about 250 SUS greater than the viscosity of said starting material at 210° F., thereafter reacting said intermediate stage condensation product with elemental sulfur to further increase the viscosity thereof at 210° F., and reacting the sulfur-modified condensation product so produced with diphenylamine.

14. An oleaginous composition containing an amount sufficient to improve the viscosity index thereof of a substantially oil compatible hydrocarbonaceous condensation product, said condensation product being produced by contacting a hydrocarbon starting material having an ebullioscopic molecular weight in excess of about 500 while at a temperature of at least about 400° F. with at least about 2% by weight of elemental sulfur for a time period requisite to produce a first condensation product, and thereafter further reacting said first condensation product so produced with an aromatic amine to produce a final condensation product effective in a concentration of about 10% by weight to increase the viscosity index of a 60 at 100 SUS standard base oil at least ten viscosity index units more than a like amount of the hydrocarbon starting material from which said condensation product is produced.

15. An oleaginous composition containing an amount sufficient to improve the viscosity index thereof of a substantially oil compatible hydrocarbonaceous condensation product, said condensation product being produced by contacting a hydrocarbon starting material having an ebullioscopic molecular weight in excess of about 500 while at a temperature of at least about 400° F. with at least about 2% by weight of elemental sulfur for a time period requisite to produce a first condensation product, and thereafter further reacting said first condensation product so produced with a polyalkylene polyamine to produce a final condensation product effective in a concentration of about 10% by weight to increase the viscosity index of a 60 at 100 SUS standard base oil at least ten viscosity index units more than a like amount of the hydrocarbon starting material from which said condensation product is produced.

16. The composition of claim 15 wherein the polyalkylene polyamine is selected from the group consisting of diethylene triamine, triethylene tetramine and tetraethylene pentamine.

17. An oleaginous composition having a boiling point in excess of 400° F. and a flash point in excess of 200° F., said composition containing a viscosity index improving amount of a hydrocarbonaceous condensation product having a combined oxygen content not in excess of about 5% by weight, said condensation product being produced by contacting a hydrocarbon starting material having a molecular weight in excess of about 500, while at a temperature of from about 400° F. to about 600° F., with a free oxygen-containing gas, and thereafter reacting the condensate so produced with a material selected from the group consisting of ammonia and the polyalkylene polyamines to produce a final product effective in a concentration of about 10% by weight to increase the viscosity index of a standard base mineral oil derived from a paraffinic crude source at least ten viscosity index units more than a like amount of the hydrocarbon starting material from which said condensation product is formed.

References Cited in the file of this patent

UNITED STATES PATENTS

| | | |
|---|---|---|
| 1,863,004 | Burwell | June 14, 1932 |
| 2,206,151 | Bennett | July 2, 1940 |
| 2,257,328 | Bray | Sept. 30, 1941 |
| 2,706,176 | Frazier | Apr. 12, 1955 |